Patented Aug. 11, 1953

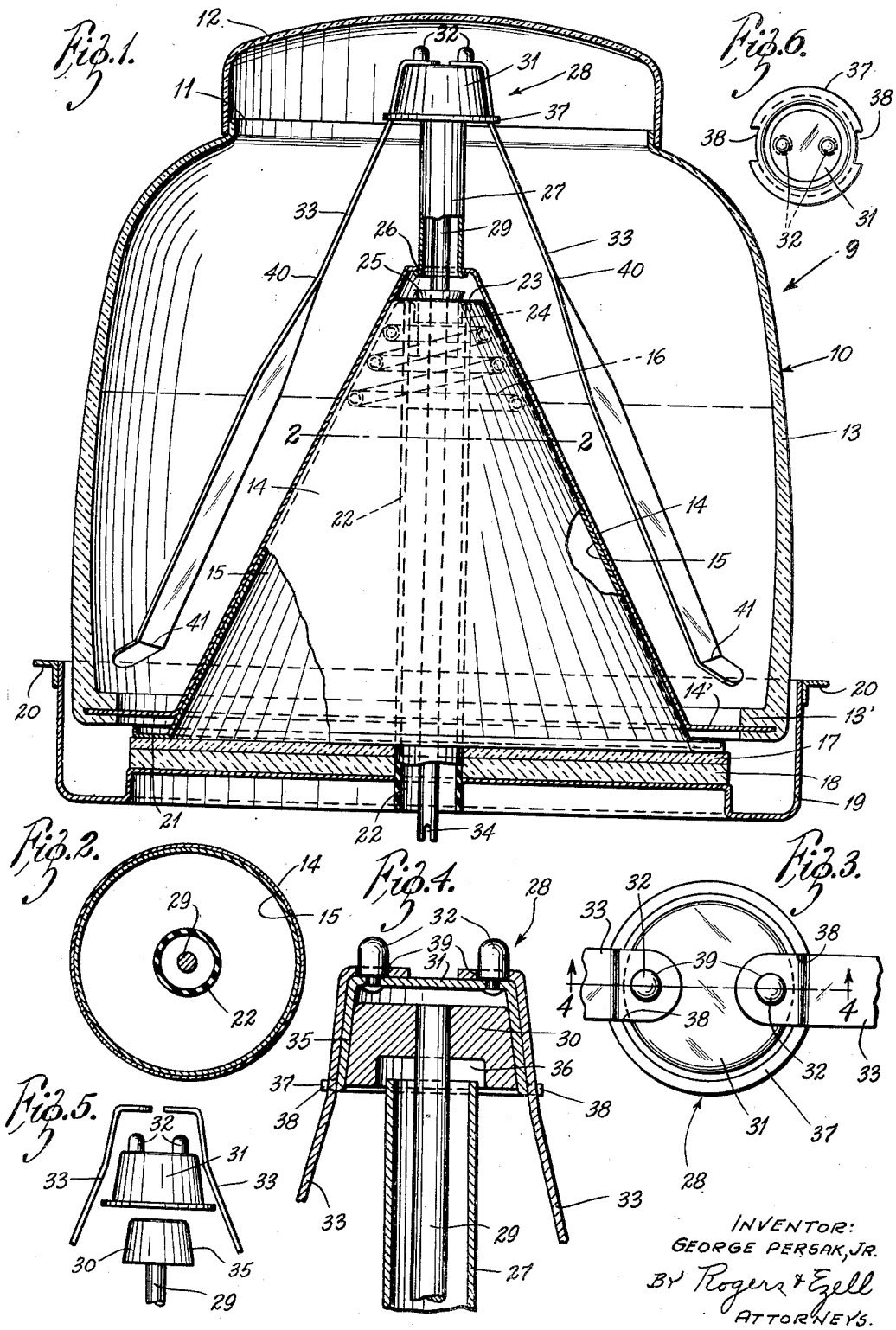

2,648,528

UNITED STATES PATENT OFFICE 2,648,528

BEVERAGE DISPENSER

George Persak, Jr., Verona, N. J., assignor to Lloyd E. Rabjohn, Los Angeles County, Calif.

Application March 30, 1950, Serial No. 152,928

4 Claims. (Cl. 259—107)

The present invention relates to beverage dispensers, and more particularly to beverage dispensers requiring agitation of the liquid content either to facilitate heat exchange or to maintain uniform dispersion of insoluble food substances.

In brief, the present invention comprises a beverage container assembly including a stirring assembly having frictionally engageable driving-driven elements and readily mountable and demountable paddles. A liquid container is provided which has a metal reentrant bottom and a continuous plastic side wall sealed thereto.

As is well known, most beverages, in order to invite favorable consumer interest, must be maintained at temperatures either well above or well below normal atmospheric temperatures. Where the desired temperature to be maintained by an appropriate heat exchanger in contact with a portion of the beverage container is near freezing, as is true with citrus juices, freezing of the liquid adjacent the heat exchanger is prevented and efficiency of heat transfer as well as uniformity of temperature throughout the liquid are obtained by mechanical agitation of the liquid.

An object of the present invention is, therefore, in a cold drink dispenser, to prevent freezing of the beverage and to increase the efficiency of heat transfer between the beverage and the heat exchanger by providing flow contact between the same, and at the same time so to agitate the whole liquid body as to maintain a substantially uniform temperature throughout.

In addition to the above-mentioned temperature requirement, some beverages contain precipitated matter or other insoluble substances which, if the liquid is at rest, will settle to the bottom of the container. Beverages of this type, for example, citrus fruit juices containing a quantity of fruit pulp, will require constant agitation to maintain uniform dispersion of the solids throughout the liquid. Another object of the present invention, therefore, is to provide a novel means of maintaining uniform dispersion of normal solid content throughout the beverage.

Inasmuch as the present invention contemplates the use of physical elements which will contact foods intended for human consumption, another object of the present invention is to provide a novel readily removably assembly for the purpose of periodic cleaning and sterilizing.

It is obvious that a stirring assembly of the type contemplated must be mechanically driven. It is, therefore, desirable that the driving mechanism be protected against overloads such as those which might result from the retardation of the stirring elements by an abnormal accumulation of solids, such, for example, as ice accretion on the heat exchanger or at the bottom of the container. Another object of the invention, therefore, is to provide protection against damage to the driving mechanism due to overload on the stirring assembly.

The accompanying drawing and the following detailed description will make evident the manner in which the present invention accomplishes the objectives set forth above, and will demonstrate clearly the inherent advantages of the present invention over the prior art.

In the drawings:

Figure 1 is a vertical diametric section through the beverage container of a cold drink dispenser incorporating the teachings of the present invention;

Figure 2 is a horizontal section taken generally on the line 2—2 of Figure 1;

Figure 3 is an enlarged plan view of the stirring assembly, the paddles being broken away for conservation of space;

Figure 4 is a vertical section taken on substantially the line 4—4 of Figure 3;

Figure 5 is an exploded view of the upper part of the stirring assembly; and

Figure 6 is a plan view of a paddle holder.

Referring to the drawing more particularly by reference numerals, 9 indicates generally a beverage container assembly forming part of a dispenser unit and incorporating the concepts of the present invention, which includes a container 10 having a top opening 11 closed by a removable cover 12. A continuous side wall 13 may be formed to appropriate shape and may be of any suitable material, but preferably is of transparent plastic, glass, or the like. A bottom 14 is reentrant frusto-conical in shape and is formed from sheet metal for maximum strength and efficient heat conductivity. The bottom 14 includes an annular horizontal flange 14', the outer portion of which sealingly engages in an annular slot in a flange 13' integral with the wall 13, being cemented therein. The bottom 14 rests in heat exchange contact upon a heat exchanger wall 15, which is also frusto-conical in shape. The wall 15, therefore, supports the liquid container assembly 9.

Disposed within a chamber formed by the wall 15 and in physical contact with the wall 15 is a coil 16 which serves to effect heat transfer through the contiguous walls 14 and 15 and from or to the beverage as required. The heat exchanger assembly comprising the wall 15 and the coil 16 rests upon a plate 17 of relatively non-conducting material having structural stiffness. The plate 17, in turn, rests upon a plate 18 which is of an efficient insulating material without the requirement of structural stiffness. The plate 18, in turn, rests upon a base 19 which is appropriately formed from sheet metal and stiffened by means of angles 20. A lower flange 21 of the wall 15 is securely attached through the plates 17 and 18 to the base 19 so as to form a rigid assembly.

Concentric with the heat exchanger assembly and forming a part thereof is a tube 22 which passes through the center of the base 19 and the plates 17 and 18, and abuts an inturned horizontal annular flange 23 of the wall 15. Fitted into a reversed annular flange 24 depending from the flange 23 and secured thereto by appropriate means is a sleeve bearing 25 having a bore concentric with the mutual axis of the heat exchanger wall 15 and the tube 22.

Referring to Figure 1, the frusto-conical bottom 14 of the liquid container 10 has a circular opening 26 at the top into which is fitted and appropriately secured a tube 27, which extends upwardly to or above the opening 11 and serves to prevent liquid flowing or splashing down through the opening 26.

Within the container 10 is a liquid stirring assembly 28 which comprises a driven stirring shaft 29, a paddle driver 30, a paddle holder 31 with attached paddle pins 32, and detachable paddles 33. The lower end of the stirring shaft 29 has a slot 34 which fits over a coupling pin (not shown) in a suitable driving mechanism. The paddle driver 30 is press fitted on and pinned to the upper end of the stirring shaft 29 and includes an annular frusto-conical side wall 35 which is engaged through frictional contact by a similarly shaped side wall of the paddle holder 31. The paddle driver 30 has a recess 36 into which the tube 27 may partially extend, the size of the recess, however, being such to provide at all times during operation a positive separation of the paddle driver 30 and the tube 27 to insure proper engagement of the slot 34 with the coupling pin (not shown). The paddle holder 31 is cup-shaped, being disposed bottom up, and has an outturned annular flange 37 which includes diametrically disposed notches or slots 38 as shown in Figure 6. On the flat top of the paddle holder 31 and in the radial plane of each slot 38 is mounted, as by riveting, a paddle pin 32.

The paddles 33 may be formed from flat metal strips of uniform width, as illustrated. At their upper or driving ends, each paddle 33 has a hole 39, as shown in Figure 3, which engages a paddle pin 32. Thereafter, the paddles are bent to conform to the outside shape of the paddle holder 31, and pass through the slots 38. Below the slots 38, the paddles 33 are bent so as to avoid contact with the reentrant frusto-conical bottom 14 of the liquid container 10. Below an appropriate point, such as 40 in Figure 1, the paddle 33 may be twisted to impart the desired turbulence to the liquid. Additionally, the paddles 33 may be bent at a point, such as 41, to insure completed dispersion of heavy solid matter throughout the liquid. It is to be noted that the portions of the paddles 33 below the points 40 of each are twisted so that engagement of liquid in the container 10 by such lower paddle portions tends to deflect the paddles 33 toward the bottom 14.

In assembling the stirring assembly 28 for use, the stirring shaft 29 with the attached paddle driver 30 is first inserted through the bearing 25 and turned to engage the slot 34 with the coupling drive pin (not shown) which is the sole support of the stirring assembly 28. The paddle holder 31 is then placed on top of the paddle driver 30 and finally the paddles 33 are placed over the paddle pins 32 so as to be held in proper position by the paddle pins and by slots 38. Removal of the stirring assembly is equally simple and is accomplished without tools by reversing the above-described action.

An important feature of the stirring assembly is the frictional drive between the paddle driver 30 and the paddle holder 31. Should the rotating motion of the paddles 33 be unduly retarded due to ice formations or through other causes, damage to the stirring motor from overload will be prevented by slippage between the paddle driver 30 and the paddle holder 31.

It is clear that there has been provided a novel beverage container assembly which fulfills the objects and advantages sought therefor.

It is to be understood that the foregoing description and the accompanying drawing have been given by way of illustration and example. It is also to be understood that changes in form of the elements, rearrangement of parts and substitution of equivalent elements, which will be obvious to those skilled in the art, are contemplated as within the scope of the present invention which is limited only by the claims which follow.

What is claimed is:

1. In a stirring assembly, in combination, a rotatable shaft, a driving head affixed to the shaft for rotation therewith, a paddle holder removably disposed on said head for normal movement therewith including spaced upwardly extending pins, and paddles supportingly connected to said holder for movement therewith, each paddle comprising a metal strip of uniform width and including an aperture receiving a pin for mounting the same.

2. In a stirring assembly, in combination, a movable support, a paddle holder disposed on said movable support for movement therewith, said paddle holder being of inverted cup form and having spaced radially disposed pins extending upwardly therefrom and having an outwardly directed annular flange, said flange having notches radially aligned with said pins, and paddles supportingly connected to said holder for movement therewith, each paddle including an aperture receiving a pin and a portion disposed in an aligned slot, a pin and a slot maintaining each paddle in operative position.

3. In a stirring assembly, in combination, a movable support, a paddle holder disposed on said movable support for movement therewith, said paddle holder being of inverted cup form and having spaced radially disposed pins extending upwardly therefrom and having an outwardly directed annular flange, said flange having notches radially aligned with said pins, and paddles supportingly connected to said holder for movement therewith, each paddle including an aperture receiving a pin and a portion disposed in an aligned slot, a pin and a slot maintaining each paddle in operative position, each paddle comprising a member depending angularly from said paddle holder and disposed at its lower end to engage a liquid in a stirring relationship to continuously urge the lower end of the paddle inwardly.

4. In a stirring assembly, in combination, a movable support, a paddle holder disposed on said movable support for movement therewith, said paddle holder being in frictional engagement with said movable support for driven movement of the former by the latter, said paddle holder being of inverted cup form and having spaced radially disposed pins extending upwardly therefrom and having an outwardly directed annular flange, said flange having notches radially aligned with said pins, and paddles supportingly connected to said holder for movement therewith, each paddle including an aperture receiving a pin and a portion disposed in an aligned slot, a pin and a slot maintaining each paddle in operative position.

GEORGE PERSAK, Jr.

References Cited in the file of this patent

UNITED STATES PATENTS

| Number | Name | Date |
|---|---|---|
| 978,372 | Hayne et al. | Dec. 13, 1910 |
| 1,724,383 | Walker | Aug. 13, 1929 |
| 1,741,317 | Kirby | Dec. 31, 1929 |
| 1,765,067 | Frantz | June 17, 1930 |
| 1,948,834 | Volk | Feb. 27, 1934 |
| 1,975,265 | Fulenwider | Oct. 2, 1934 |
| 1,987,817 | Burns | Jan. 15, 1935 |
| 2,422,545 | Hanson | June 17, 1947 |
| 2,494,719 | Rabjohn | Jan. 17, 1950 |

FOREIGN PATENTS

| Number | Country | Date |
|---|---|---|
| 110,668 | Australia | June 6, 1940 |